US011986956B2

(12) United States Patent
Nakamura et al.

(10) Patent No.: US 11,986,956 B2
(45) Date of Patent: May 21, 2024

(54) JOINT AND SPEED REDUCER

(71) Applicant: Nabtesco Corporation, Tokyo (JP)

(72) Inventors: Koji Nakamura, Tokyo (JP); Shinji Inoue, Tokyo (JP)

(73) Assignee: NABTESCO CORPORATION, Tokyo (JP)

( * ) Notice: Subject to any disclaimer, the term of this patent is extended or adjusted under 35 U.S.C. 154(b) by 0 days.

(21) Appl. No.: 18/161,314

(22) Filed: Jan. 30, 2023

(65) Prior Publication Data

US 2023/0249336 A1 Aug. 10, 2023

(30) Foreign Application Priority Data

Feb. 4, 2022 (JP) .................................. 2022-016335

(51) Int. Cl.
*F16H 57/025* (2012.01)
*B25J 9/10* (2006.01)
(Continued)

(52) U.S. Cl.
CPC ............. *B25J 9/102* (2013.01); *B25J 9/126* (2013.01); *B25J 17/00* (2013.01); *F16H 57/025* (2013.01);
(Continued)

(58) Field of Classification Search
CPC ................. F16H 57/025; F16H 57/031; F16H 2057/02073
See application file for complete search history.

(56) References Cited

U.S. PATENT DOCUMENTS 1,832,991 A * 11/1931 Levin .................... B61C 9/48
74/609
2,655,265 A * 10/1953 Little ................... B01D 33/463
210/119
(Continued)

FOREIGN PATENT DOCUMENTS

CN 211550318 U 9/2020
DE 102008045807 A1 * 3/2010 ............... F16H 1/28
(Continued)

OTHER PUBLICATIONS

Extended European Search Report dated Jun. 20, 2023, issued in corresponding European Patent Application No. 23153427.2 (9 pgs.).

*Primary Examiner* — Thomas C Diaz
(74) *Attorney, Agent, or Firm* — Pillsbury Winthrop Shaw Pittman, LLP

(57) ABSTRACT

A joint according to one aspect of the disclosure includes: a joint body having an input gear meshing with a speed reduction mechanism, the joint body receiving an output shaft of a motor detachably coupled to the joint body; a motor flange disposed between the speed reduction mechanism and the motor and rotatably supporting the joint body; and an intermediate flange connecting between the motor flange and the motor. At least one fixing member for fixing the joint body and the output shaft to each other is provided at at least one position in the joint body that overlaps with the intermediate flange as viewed from a radial direction. The intermediate flange is formed as an annulus surrounding the joint body by a plurality of split pieces that can be split in a circumferential direction.

13 Claims, 7 Drawing Sheets

(51) Int. Cl.
*B25J 9/12* (2006.01)
*B25J 17/00* (2006.01)
*F16H 57/031* (2012.01)
*F16H 57/02* (2012.01)

(52) U.S. Cl.
CPC . *F16H 57/031* (2013.01); *F16H 2057/02073* (2013.01)

(56) References Cited

U.S. PATENT DOCUMENTS 4,142,811 A  3/1979  Burnham
6,824,495 B1 * 11/2004  Kirschner ................ F16H 1/28
                                            475/331

FOREIGN PATENT DOCUMENTS

JP          2000-161376 A    6/2000
WO       WO-2007017113 A1 *  2/2007  ........... F16H 57/025

\* cited by examiner

JOINT AND SPEED REDUCER

CROSS-REFERENCE TO RELATED APPLICATIONS

This application is based on and claims the benefit of priority from Japanese Patent Application Serial No. 2022-016335 (filed on Feb. 4, 2022), the contents of which are hereby incorporated by reference in their entirety.

TECHNICAL FIELD

The present disclosure relates to a joint and a speed reducer.

BACKGROUND

For example, industrial robots are equipped with a pair of arms coupled to each other in a rotatable manner. A motor unit is provided at a coupling portion (joint portion) of the pair of arms to drive the arms. The motor unit includes a motor and a speed reducer coupled to the motor. In the motor unit, the driving force of the motor is decelerated by the speed reducer and then outputted to the arms.

As disclosed in Japanese Patent Application Publication No. 2000-161376 ("the '376 Publication") for example, the output shaft of the motor is coupled to the input shaft of the speed reducer via a coupling.

The output shaft of the motor is inserted into the shaft hole of the coupling. The coupling has threaded holes that connect the inside and outside of the shaft hole in the radial direction of the coupling. Setscrews are tightened in the threaded holes to retain the output shaft of the motor in the shaft hole.

In the configuration related to the '376 Publication, the coupling is surrounded by the cover of the speed reducer. Therefore, the cover of the speed reducer has tool insertion holes in the radial direction of the coupling that allow access to the setscrews (threaded holes).

However, in the conventional art, when attaching and detaching the motor to and from the speed reducer, it is necessary to insert a tool through the tool insertion hole to the threaded hole after aligning the phases of the tool insertion holes and the threaded holes in the circumferential direction of the coupling. Therefore, there was still room for improvement in the conventional art in terms of work efficiency and reduction of work space when attaching and detaching the motor.

SUMMARY

The present disclosure provides a joint and a speed reducer capable of improving work efficiency and reducing work space when attaching and detaching the motor.

To overcome the above drawback, the present disclosure has the following aspects. (1) A joint according to one aspect of the disclosure comprises: a joint body having an input gear meshing with a speed reduction mechanism, the joint body receiving an output shaft of a motor detachably coupled to the joint body; a motor flange disposed between the speed reduction mechanism and the motor; and an intermediate flange connecting between the motor flange and the motor, wherein at least one fixing member for fixing the joint body and the output shaft to each other is provided at at least one position in the joint body that overlaps with the intermediate flange as viewed from a radial direction intersecting a rotation axis of the joint body, and wherein the intermediate flange includes a plurality of split pieces capable of splitting in a circumferential direction around the rotation axis, and the intermediate flange is formed as an annulus surrounding the joint body by the plurality of split pieces assembled together.

According to this aspect, the split pieces can be removed, such that at least a part of the portion of the joint body that overlaps with the intermediate flange as viewed from the radial direction can be opened in the radial direction as the maintenance space. This allows the maintenance space to have a larger range in the circumferential direction as compared to the conventional method of attaching and detaching the motor through the tool insertion hole in the cover of the speed reducer. Thus, it is easier (or unnecessary) to phase the fixing member with the maintenance space in the circumferential direction, allowing easy access of the tool to the fixing member. This also reduces the work space as compared to the conventional method of introducing the tool from the outside of the cover of the speed reducer. As a result, the work efficiency can be improved and the work space can be reduced in attaching and detaching the motor.

(2) In the joint according to the above aspect, it is preferable that a seal member is provided between an inner peripheral surface of the motor flange and an outer peripheral surface of the joint body to seal between the motor flange and the joint body.

(3) In the joint according to the above aspect, it is preferable that the plurality of split pieces have a connection portion that connects in the circumferential direction the split pieces adjacent to each other in the circumferential direction.

(4) In the joint according to the above aspect, it is preferable that the at least one fixing member comprises two fixing members arranged at an interval in the circumferential direction, and at least one of the plurality of split pieces has an angular dimension in the circumferential direction that is equal to or larger than a minimum interval between the two fixing members in the circumferential direction.

(5) In the joint according to the above aspect, it is preferable that one of the intermediate flange and the motor flange is defined as a first flange, and the other is defined as a second flange, a tube is formed on an outer peripheral edge of the first flange, and the tube projects in an axial direction along the rotation axis and extends over an entire periphery of the first flange, and a receiving recess is formed in an outer peripheral edge of the second flange, and the receiving recess receives the tube.

(6) A joint according to one aspect of the disclosure comprises: a joint body having an input gear meshing with a speed reduction mechanism, the joint body receiving an output shaft of a motor detachably coupled to the joint body; a motor flange disposed between the speed reduction mechanism and the motor; an intermediate flange connecting between the motor flange and the motor, and a seal member provided between an inner peripheral surface of the motor flange and an outer peripheral surface of the joint body to seal between the motor flange and the joint body, wherein two fixing members for fixing the joint body and the output shaft to each other are provided at positions in the joint body that overlap with the intermediate flange as viewed from a radial direction intersecting a rotation axis of the joint body, and the two fixing members are arranged at an interval in a circumferential direction around the rotation axis, wherein the intermediate flange includes a plurality of split pieces capable of splitting in the circumferential direction, and the intermediate flange is formed as an annulus surrounding the joint body by the plurality of split pieces assembled together, wherein at least one of the plurality of split pieces has an angular dimension in the circumferential direction that is equal to or larger than a minimum interval between the two fixing members in the circumferential direction, wherein the plurality of split pieces have a connection portion that connects in the circumferential direction the split pieces adjacent to each other in the circumferential direction, wherein one of the intermediate flange and the motor flange is defined as a first flange, and the other is defined as a second flange, wherein a tube is formed on an outer peripheral edge of the first flange, and the tube projects in an axial direction along the rotation axis and extends over an entire periphery of the first flange, and wherein a receiving recess is formed in an outer peripheral edge of the second flange, and the receiving recess receives the tube. (7) A speed reducer according to one aspect of the disclosure comprises: a joint; and a speed reduction mechanism meshed with an input gear of the joint, wherein the joint includes: a joint body having the input gear, the joint body receiving an output shaft of a motor detachably coupled to the joint body; a motor flange disposed between the speed reduction mechanism and the motor; and an intermediate flange connecting between the motor flange and the motor, wherein at least one fixing member for fixing the joint body and the output shaft to each other is provided at at least one position in the joint body that overlaps with the intermediate flange as viewed from a radial direction intersecting a rotation axis of the joint body, and wherein the intermediate flange includes a plurality of split pieces capable of splitting in a circumferential direction around the rotation axis, and the intermediate flange is formed as an annulus surrounding the joint body by the plurality of split pieces assembled together.

Advantageous Effects

The above aspects make it possible to improve work efficiency and reduce work space when attaching and detaching the motor.

DESCRIPTION OF THE EMBODIMENTS

Figure 1:
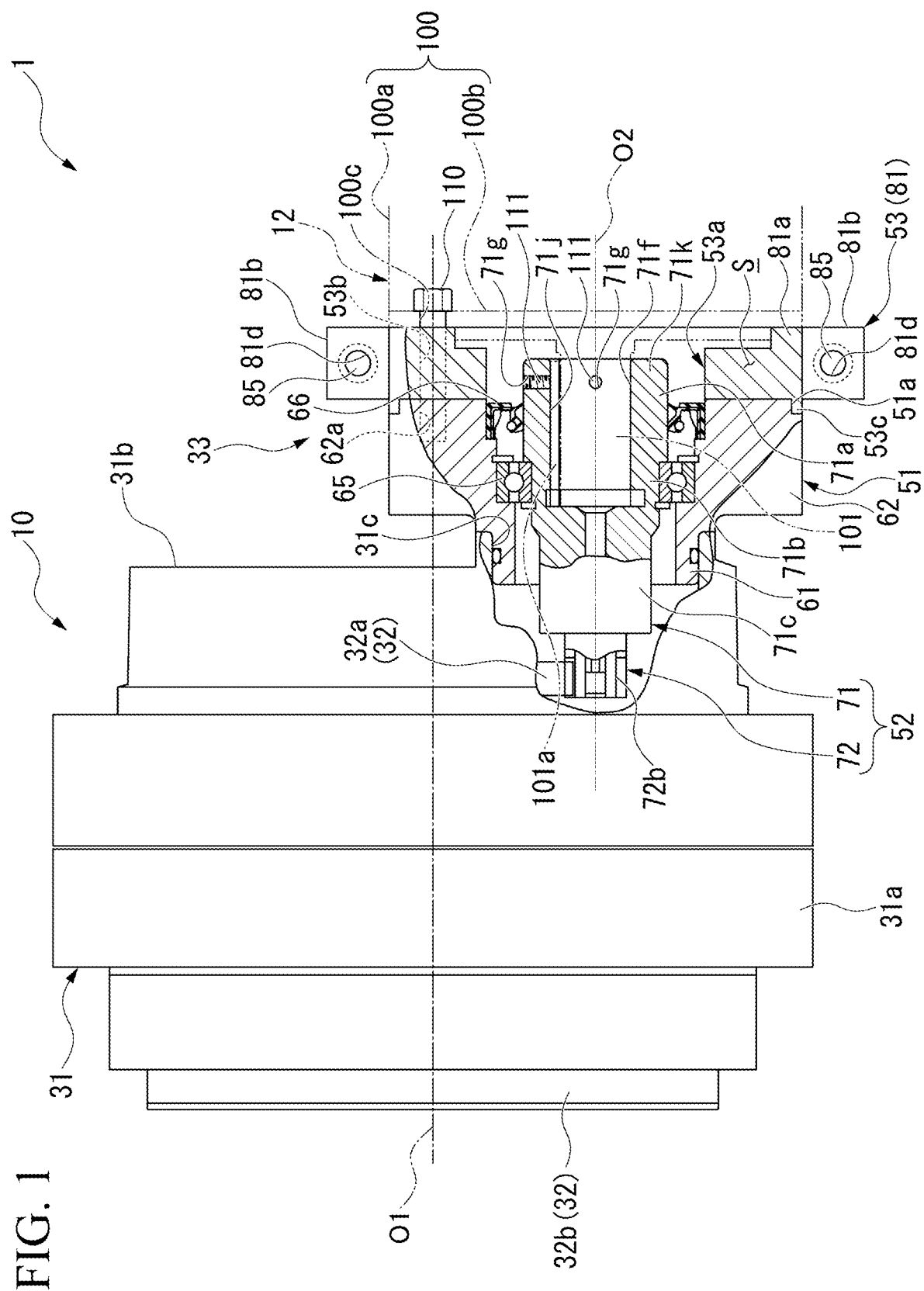
FIG. 1 is a sectional view showing a part of a motor unit according to an embodiment, cut along the I-I line of FIG. 3.

The embodiments of the present disclosure will be hereinafter described with reference to the drawings. In the following description of the embodiments and modifications, the corresponding elements will be denoted by the same reference numerals and may not be repeatedly described. In the following description, such terms as "parallel," "orthogonal," "center" and "coaxial" may appear to describe relative or absolute positions. These terms are not only strictly used but also intended to allow some tolerances and relative differences in angle and distance as long as the same effects can be still produced.

[Motor Unit 1]

Figure 3:
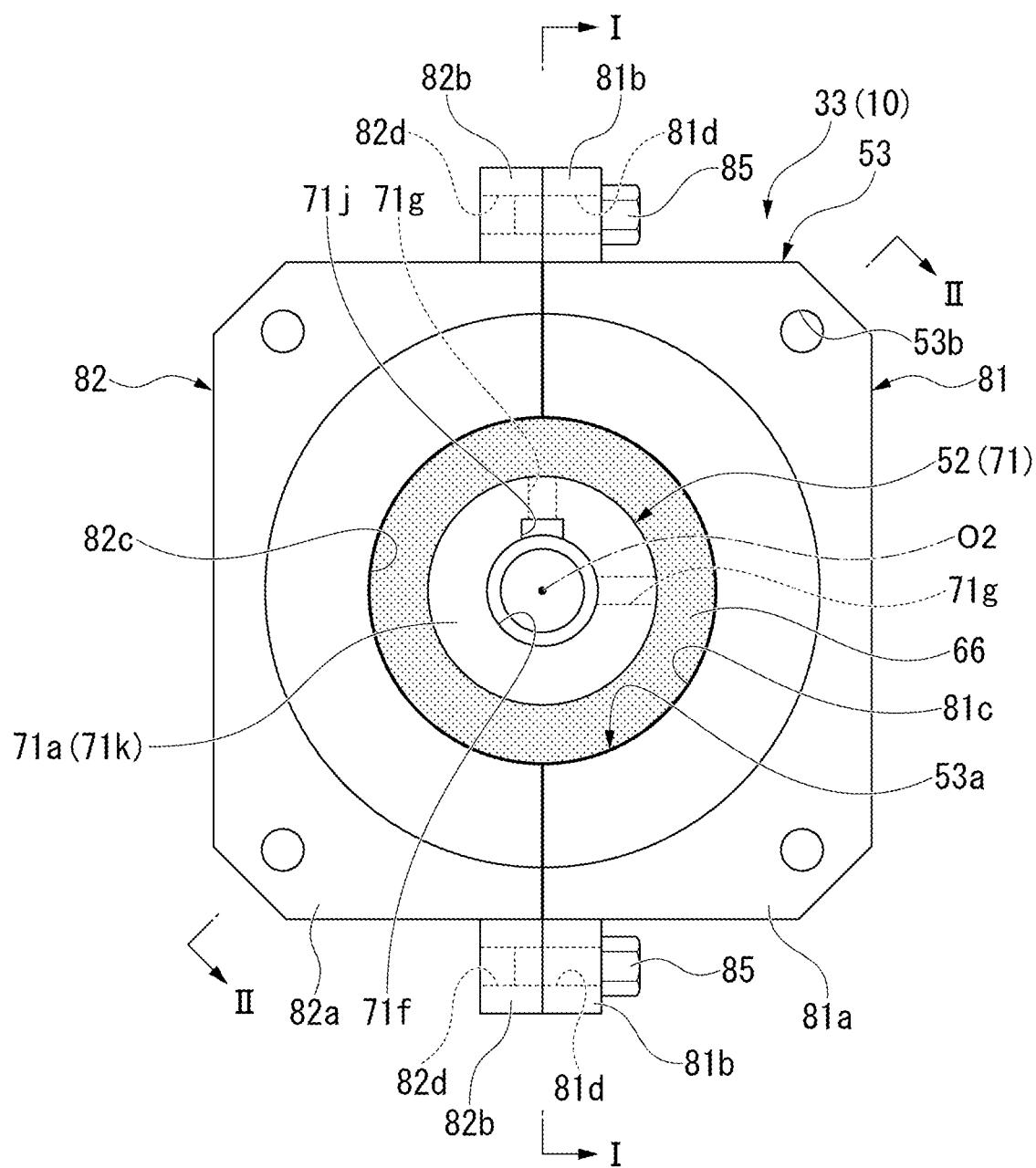
FIG. 3 is a front view of the joint according to the embodiment viewed from a second side in the axial direction.

FIG. 1 is a sectional view showing a part of a motor unit 1 cut along the I-I line of FIG. 3. As shown in FIG. 1, the motor unit 1 is installed on, for example, an industrial robot. The motor unit 1 is provided in a coupling portion (joint portion) between a pair of arms rotatably coupled to each other. The motor unit 1 includes a speed reducer 10 and a motor 12. In the motor unit, the driving force outputted from the motor 12 is decelerated by the speed reducer 10 and then outputted to a first arm of the pair of arms. In this embodiment, the rotational axis of the speed reducer 10 (hereinafter referred to as the first axis O1) and the rotational axis of the motor 12 (hereinafter referred to as the second axis O2) are not aligned but parallel to each other. In the following description, the direction along the axes O1 and O2 may be referred to as the axial direction, the direction intersecting the first axis O1 as viewed from the axial direction may be referred to as the first radial direction, and the direction intersecting the second axis O2 as viewed from the axial direction may be referred to as the second radial direction. The direction encircling the first axis O1 may be referred to as the first circumferential direction, and the direction encircling the second axis O2 may be referred to as the second circumferential direction. The axes O1 and O2 may be coaxially aligned.

<Speed Reducer 10>

The speed reducer 10 includes a case 31, a speed reduction mechanism 32, and a joint 33. The case 31 is disposed coaxially with the first axis O1 and is shaped like a bottomed tube open toward a first side in the axial direction. The peripheral wall 31a of the case 31 is coaxial with the first axis O1. The bottom wall 31b of the case 31 closes the opening in the peripheral wall 31a on a second side in the axial direction. A connecting port 31c is formed in the bottom wall 31b at a position eccentric to the first axis O1. The connecting port 31c extends through the bottom wall 31b in the axial direction. The connecting port 31c is shaped like a circle coaxial with the second axis O2.

The speed reduction mechanism 32 is housed in the case 31. The speed reduction mechanism 32 decelerates the driving force of the motor 12 at the stage prior to the first arm. The speed reduction mechanism 32 is, for example, an eccentric oscillation gear mechanism. The speed reduction mechanism 32 includes a transmission gear 32a, a carrier 32b, and a plurality of gears (not shown) connecting between the transmission gear 32a and the carrier 32b. The various gears that constitute the speed reduction mechanism 32 are supported directly or indirectly by the case 31 in a rotatable manner.

The transmission gear 32a is disposed in the case 31 at the second side end in the axial direction so as to be rotatable. As viewed from the axial direction, a part of the transmission gear 32a overlaps with the connecting port 31c. The carrier 32b is disposed in the case 31 at the first side end in the axial direction so as to be rotatable about the first axis O1. A part of the carrier 32b is exposed through the first side opening of the case 31 in the axial direction. The carrier 32b is connected to the first arm. A seal ring (not shown) is disposed between the outer peripheral edge of the carrier 32b and the peripheral wall 31a.

<Joint 33>

Figure 2:
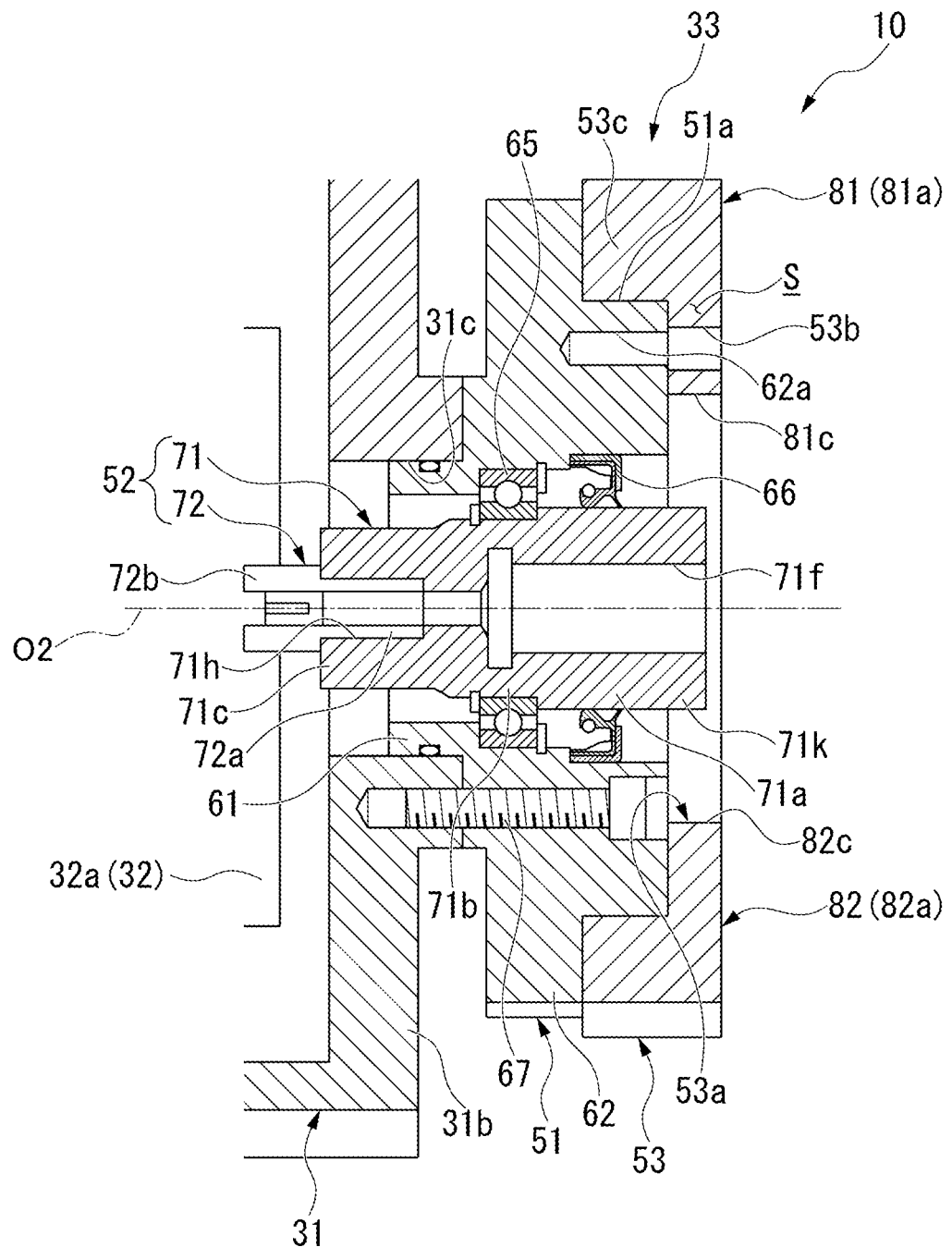
FIG. 2 is a sectional view of a joint corresponding to the II-II line of FIG. 3.

FIG. 2 is a sectional view of the joint 33 corresponding to the II-II line of FIG. 3. As shown in FIGS. 1 and 2, the joint 33 connects between the motor 12 and the speed reducer 10. The joint 33 includes a motor flange 51, a joint body 52, and an intermediate flange 53. The motor flange 51 is located between the motor 12 and the speed reducer 10 in the axial direction. The motor flange 51 has a tubular shape coaxially aligned with the second axis O2. The motor flange 51 includes a coupling tube 61 and a projection 62.

The coupling tube 61 is fitted into the connecting port 31c with an O-ring disposed between the outer peripheral surface of the coupling tube 61 and the inner peripheral surface of the connecting port 31c. The projection 62 extends outward in the second radial direction from the second side end of the coupling tube 61 in the axial direction. The motor flange 51 and the case 31 are fixed together by a first bolt 67 (see FIG. 2). The first bolt 67 extends through the projection 62 from the second side in the axial direction and is tightened to the bottom wall 31b. The projection 62 has internally threaded holes 62a formed at positions different from that of the first bolt 67 in the second circumferential direction. The internally threaded holes 62a are arranged at intervals in the second circumferential direction. The internally threaded holes 62a in the projection 62 are open toward the second side in the axial direction.

A bearing 65 is fitted in the projection 62. A seal ring 66 is fitted in the projection 62 at a position on the second side in the axial direction relative to the bearing 65.

The joint body 52 is supported on the inner side of the motor flange 51 so as to be rotatable about the second axis O2. The joint body 52 extends through the inside of the motor flange 51 and the connecting port 31c in the axial direction. The joint body 52 includes a coupling portion 71 and an input gear 72.

The coupling portion 71 has a multi-stage columnar shape with a reducing outer diameter toward the first side in the axial direction. The coupling portion 71 includes a large diameter portion 71a located in the second side of the coupling portion 71 in the axial direction, a medium diameter portion 71b continuous to the first side of the large diameter portion 71a in the axial direction, and a small diameter portion 71c continuous to the first side of the medium diameter portion 71b in the axial direction.

The large diameter portion 71a is positioned inside the projection 62 so as to partially protrude on the second side in the axial direction beyond the motor flange 51. The inner edge of the seal ring 66 is in tight contact with the outer peripheral surface of the large diameter portion 71a. The seal ring 66 is positioned between the outer peripheral surface of the large diameter portion 71a and the inner peripheral surface of the projection 62 to seal between the large diameter portion 71a and the projection 62. The internal space of the speed reducer 10 contains a lubricant. The lubricant is contained tightly in the internal space of the speed reducer 10 by sealing between the carrier 32b and case 31, between the motor flange 51 and case 31, and between the joint body 52 and the motor flange 51.

The medium diameter portion 71b is located inside the motor flange 51 so as to face the projection 62 and the coupling tube 61. The medium diameter portion 71b is fitted on the inner side of the bearing 65. The joint body 52 is rotatably supported by the motor flange 51 via the bearing 65. The small diameter portion 71c protrudes from the medium diameter portion 71b toward the first side in the axial direction. The small diameter portion 71c is located in the connecting port 31c.

The coupling portion 71 has a first coupling port 71f, an internally threaded hole 71g, and a second coupling port 71h (see FIG. 2). The first coupling port 71f receives an output shaft 101 of the motor 12 detachably coupled thereto. The first coupling port 71f extends in the large diameter portion 71a and the medium diameter portion 71b along the second axis O2. The first coupling port 71f is open at the large diameter portion 71a toward the second side in the axial direction. A key groove 71j is formed in a part of the first coupling port 71f in the second circumferential direction. The key groove 71j is recessed outward in the second radial direction relative to the inner peripheral surface of the first coupling port 71f and extends in the axial direction.

The internally threaded hole 71g is formed in a part of the large diameter portion 71a that protrudes on the second side in the axial direction beyond the motor flange 51 (hereinafter referred to as the protruding portion 71k). The internally threaded hole 71g extends through in the second radial direction between the inner peripheral surface of the first coupling port 71f and the outer peripheral surface of the large diameter portion 71a. In this embodiment, a plurality of internally threaded holes 71g are arranged at an interval (two at a 90° interval) in the second circumferential direction at positions different from that of the key groove 71j. However, the positions and the number of the internally threaded holes 71g can be changed as needed.

As shown in FIG. 2, the second coupling port 71h extends in the small diameter portion 71c along the second axis O2. The second coupling port 71h is open at the small diameter portion 71c toward the first side in the axial direction.

The input gear 72 connects between the coupling portion 71 and the transmission gear 32a. The input gear 72 includes a connection portion 72a and a gear body 72b. The connection portion 72a has a columnar shape coaxially aligned with the second axis O2. The connection portion 72a is fitted into the second coupling port 71h from the first side in the axial direction. The gear body 72b protrudes on the first side in the axial direction beyond the connection portion 72a. The gear body 72b enters the internal space of the speed reducer 10 through the connecting port 31c. The gear body 72b meshes with the transmission gear 32a in the internal space of the speed reducer 10.

FIG. 3 is a front view of the joint 33 viewed from the second side in the axial direction. As shown in FIGS. 1 to 3, the intermediate flange 53 is located in the maintenance space S formed between the motor flange 51 and the motor 12. The maintenance space S is a space around the protruding portion 71k that can be open in the second radial direction. The intermediate flange 53 as a whole is shaped like a rectangular annulus formed by combining a first split piece 81 and a second split piece 82 that can be split in the second circumferential direction. A housing hole 53a is formed in the central portion of the intermediate flange 53 in the second radial direction. The housing hole 53a is larger than the maximum inner diameter of the motor flange 51 and is a circular hole centered on the second axis O2. The housing hole 53a houses the protruding portion 71k of the large diameter portion 71a. The inner peripheral portion of the intermediate flange 53 overlaps with a part of the first bolt 67 as viewed from the axial direction.

As shown in FIG. 3, the first split piece 81 constitutes a half of the intermediate flange 53 in the second circumferential direction (a region of 180° around the second axis O2). Therefore, the angular dimension of the first split piece 81 in the second circumferential direction is equal to or larger than the minimum interval (90° around the second axis O2) between adjacent setscrews 111 (internally threaded holes 71g) arranged in the second circumferential direction.

The first split piece 81 includes a first flange portion 81a and mounting pieces (connection portions) 81b. The first flange portion 81a is shaped like an arch extending in the second circumferential direction as viewed from the axial direction. The first flange portion 81a has a first recess 81c formed around the second axis O2 and recessed outward in the second radial direction. The first recess 81c constitutes a half of the housing hole 53a in the second circumferential direction.

The mounting pieces 81b extend outward in the second radial direction from both ends of the first flange portion 81a in the second circumferential direction. Each of the mounting pieces 81b has a passage hole 81d formed therein. Each passage hole 81d extends through the corresponding mounting piece 81b in a tangential direction parallel to the outer edge of the first flange portion 81a as viewed from the axial direction.

The second split piece 82 constitutes the remaining half of the intermediate flange 53 in the second circumferential direction (a region of 180° around the second axis O2). Therefore, the angular dimension of the second split piece 82 in the second circumferential direction is equal to or larger than the minimum interval (90° around the second axis O2) between adjacent setscrews 111 (internally threaded holes 71g) arranged in the second circumferential direction.

The second split piece 82 includes a second flange portion 82a and receiving pieces (connection portions) 82b. The second flange portion 82a is formed in line symmetry with the first flange portion 81a as viewed from the axial direction. Therefore, the second flange portion 82a has a second recess 82c formed around the second axis O2 and recessed outward in the second radial direction. The second recess 82c constitutes the remaining half of the housing hole 53a in the second circumferential direction.

The receiving pieces 82b extend outward in the second radial direction from both ends of the second flange portion 82a in the second circumferential direction. Each of the receiving pieces 82b has a fastening hole 82d formed therein. Each fastening hole 82d extends through the corresponding receiving piece 82b in a tangential direction parallel to the outer edge of the second flange portion 82a as viewed from the axial direction.

The first split piece 81 and the second split piece 82 are assembled together such that the end surfaces of the first flange portion 81a and the second flange portion 82a facing each other in the second circumferential direction are in close proximity or contact with each other. In this state, the mounting pieces 81b and the corresponding receiving pieces 82b face each other in the second circumferential direction. The mounting pieces 81b and the corresponding receiving pieces 82b are fastened to each other by screws (connection portions) 85. The screws 85 extend through the passage holes 81d of the mounting pieces 81b and are tightened to the fastening holes 82d of the receiving pieces 82b. As a result, the first split piece 81 and the second split piece 82 are assembled to each other in the second circumferential direction such that the housing hole 53a is divided into the first recess 81c and the second recess 82c. The intermediate flange 53 surrounds the entire circumference of the protruding portion 71k on the outer side in the second radial direction such that the protruding portion 71k is housed in the housing hole 53a within the maintenance space S.

As shown in FIGS. 1 to 3, a plurality of through holes 53b are formed in the intermediate flange 53. The through holes 53b are formed in the corners of the intermediate flange 53. That is, the through holes 53b are spaced apart from each other in the second circumferential direction in each of the flange portions 81a, 82a. Each of the through holes 53b overlaps with the corresponding one of the internally threaded holes 62a as viewed from the axial direction.

A positioning tube 53c is formed on the outer edge of the intermediate flange 53. The positioning tube 53c protrudes from the flange portions 81a, 82a of the split pieces 81, 82 toward the first side in the axial direction. The positioning tube 53c is shaped like an annulus extending over the entire periphery of the intermediate flange 53 in the second circumferential direction. The positioning tube 53c is received in the receiving recess 51a formed in the motor flange 51. The receiving recess 51a is formed by cutting off the corner of the outer edge of the projection 62 on the second side in the axial direction over the entire periphery in the second circumferential direction. The receiving recess 51a is open toward the outside in the second radial direction and the second side in the axial direction. The positioning tube 53c is received in the receiving recess 51a and surrounds the projection 62.

<Motor 12>

As shown in FIG. 1, the motor 12 is connected to the speed reducer 10 via the joint 33. The motor 12 is, for example, a servo motor. The motor 12 includes a housing 100, an output shaft 101, a stator (not shown), and a rotor (not shown).

The housing 100 includes a housing body 100a and a mounting plate 100b. The housing body 100a is shaped like a bottomed tube that is open toward the first side in the axial direction. The mounting plate 100b is shaped like a rectangular plate, and its thickness direction coincides with the axial direction. The mounting plate 100b closes the opening of the housing body 100a on the first side in the axial direction. Each corner of the mounting plate 100b has a motor mounting hole 100c formed therein. The motor mounting holes 100c extend through the mounting plate 100b in the axial direction.

The mounting plate 100b is fixed to the motor flange 51 along with the intermediate flange 53 via second bolts 110. Each of the second bolts 110 is inserted into the corresponding motor mounting hole 100c of the mounting plate 100b from the second side in the axial direction. The second bolt 110 inserted into the motor mounting hole 100c is tightened into the internally threaded hole 62a through the corresponding second through hole 53b.

The output shaft 101 extends through the housing 100 in the axial direction. The output shaft 101 is rotatably supported by the housing 100. A key 101a is formed on a part of the output shaft 101 in the second circumferential direction. The key 101a protrudes outward in the second radial direction from the output shaft 101 and extends in the axial direction.

The output shaft 101 is coupled to the coupling portion 71. Specifically, the output shaft 101 is inserted into the first coupling port 71f such that the key 101a is received in the key groove 71j. The output shaft 101 is retained in the first coupling port 71f by the setscrews 111. The setscrews 111 are tightened into the internally threaded holes 71g. The respective distal ends of the setscrews 111 (the inner side ends in the second radial direction) protrude into the first coupling port 71f through the internally threaded hole 71g.

The respective distal ends of the setscrews 111 urge the output shaft 101 in the second radial direction in the first coupling port 71*f*.

The stator has a tubular shape coaxially aligned with the second axis O2. The stator is fitted on the inner side of the housing body 100*a*. The rotor is located on the inner side of the stator in the second radial direction in the housing body 100*a*. The rotor is fixed to the portion of the output shaft 101 that is located in the housing 100. The motor 12 generates a driving force as the rotor rotates along with the output shaft 101 by the magnetic attractive and repulsive forces generated between the stator and the rotor.

[Method of Maintaining Motor Unit 1]

Figure 4:
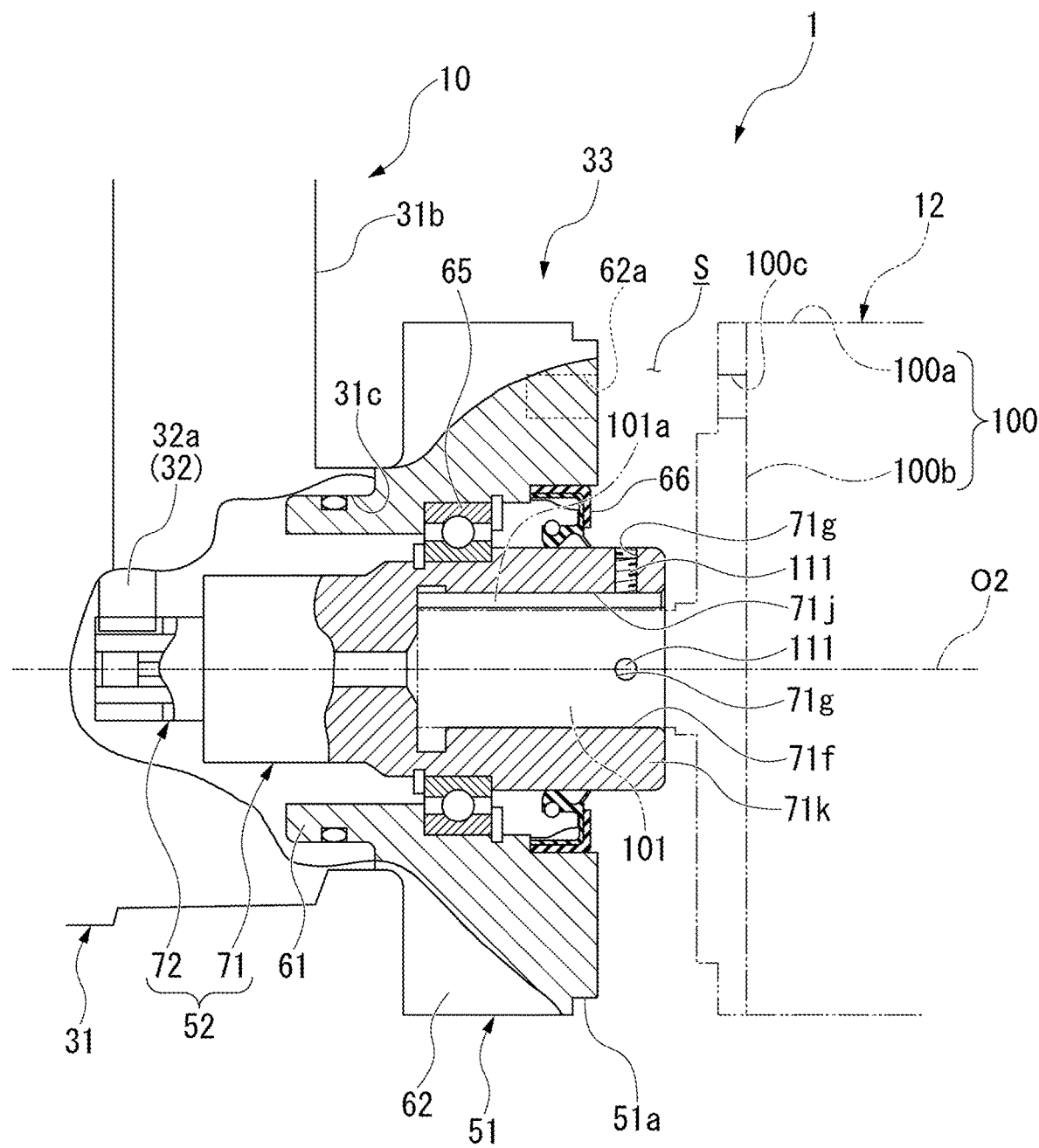
FIG. 4 is an enlarged sectional view corresponding to FIG. 1 for explaining a method of attaching and detaching a motor.
Figure 5:
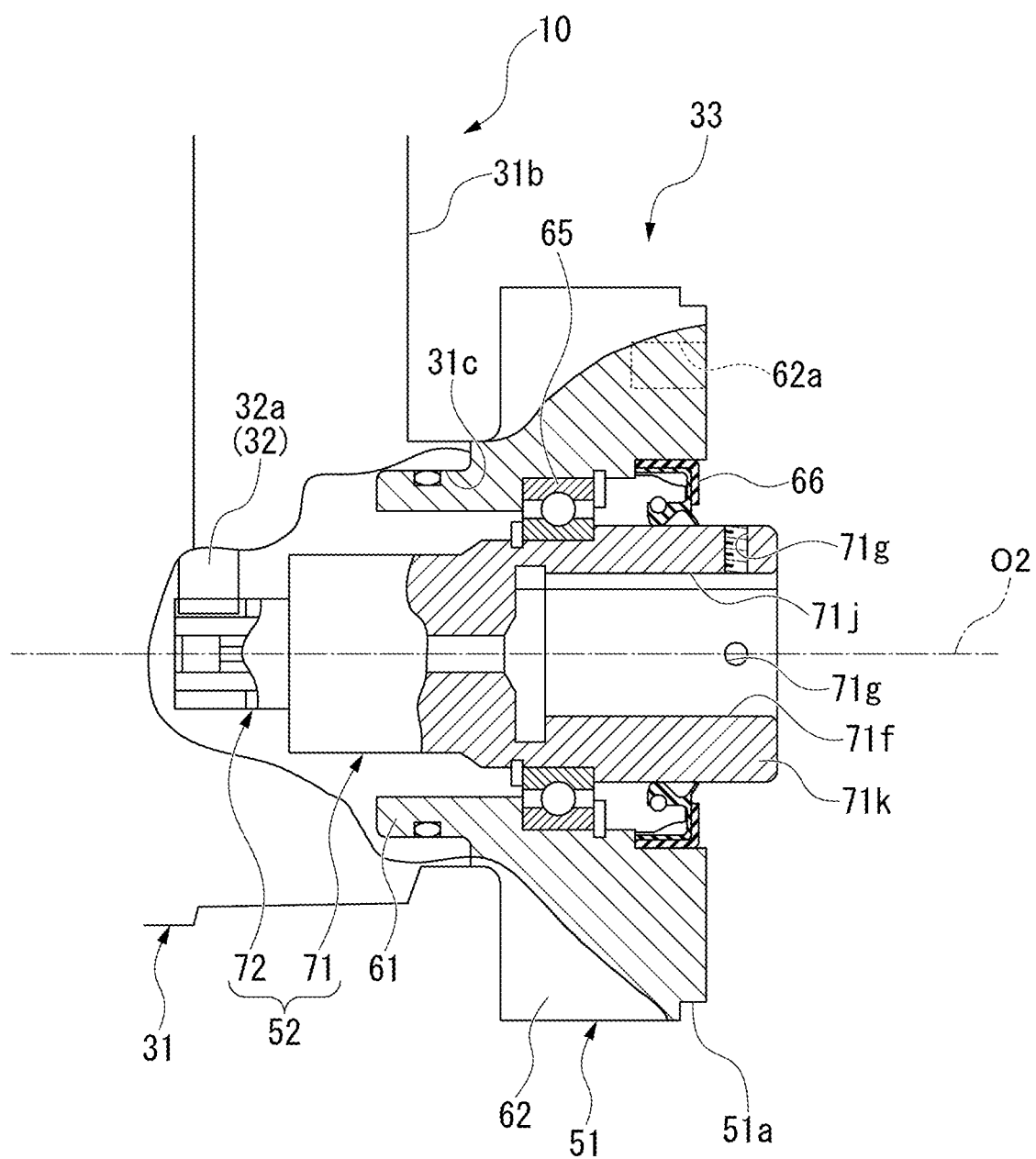
FIG. 5 is an enlarged sectional view corresponding to FIG. 1 for explaining a method of attaching and detaching a motor.

The following describes how to attach and detach the motor 12 as a method of maintaining the motor unit 1. FIGS. 4 and 5 are enlarged sectional views corresponding to FIG. 1 for explaining a method of attaching and detaching the motor. The first step to detach the motor 12 from the speed reducer 10 is to remove the second bolts 110. This step releases the fastening of the mounting plate 100*b* to the intermediate flange 53 and the motor flange 51.

Next, as shown in FIG. 4, the intermediate flange 53 is disassembled. To disassemble the intermediate flange 53, the screws 85 are removed. The split pieces 81, 82 are then released from each other. In this state, each of the split pieces 81, 82 is pulled outward in the second radial direction. As a result, the maintenance space S is opened. In other words, the protruding portion 71*k* is exposed to the outside between the motor 12 and the motor flange 51. To expose the protruding portion 71*k* to the outside, either one of the split pieces 81, 82 may be withdrawn from the maintenance space S such that a part of the maintenance space S is opened.

Then, as shown in FIG. 5, the setscrews 111 are removed through the maintenance space S. Thus, the output shaft 101 and the joint body 52 are decoupled from each other. In this state, the motor 12 is pulled out to the second side in the axial direction. In this way, the motor 12 is detached from the speed reducer 10.

To attach the motor 12 again to the speed reducer 10, the operation reverse to the above is performed. Specifically, with the key 101*a* and the key groove 71*j* aligned with each other, the output shaft 101 is inserted into the first coupling port 71*f*. In this state, the setscrews 111 are tightened into the internally threaded holes 71*g* through the maintenance space S. Thus, the output shaft 101 is coupled to the joint body 52.

Next, the intermediate flange 53 is disposed in the maintenance space S. Specifically, each of the split pieces 81, 82 is introduced into the maintenance space S from the outside in the second radial direction. At this time, the positioning tube 53*c* is received in the receiving recess 51*a*, such that the split pieces 81, 82 are restrained from moving inward in the second radial direction and toward the first side in the axial direction relative to the motor flange 51. The position of the intermediate flange 53 in the second circumferential direction relative to the motor flange 51 (and the motor 12) is adjusted such that the second through holes 53*b* in the intermediate flange 53 overlap with the corresponding internally threaded holes 62*a* and motor mounting holes 100*c* as viewed from the axial direction.

The second bolts 110 are then used to fasten the mounting plate 100*b*, the intermediate flange 53, and the motor flange 51. In this way, the motor 12 is assembled to the speed reducer 10.

Thus, in the joint 33 of this embodiment, the setscrews (fixing members) 111 for fixing the joint body 52 and the output shaft 101 to each other are provided at positions in the joint body 52 that overlap with the intermediate flange 53 as viewed from the second radial direction (the radial direction intersecting the second axis (rotation axis) O2). The intermediate flange 53 is formed as an annulus surrounding the joint body 52 by a plurality of split pieces 81, 82 that can be split in the second circumferential direction. With this configuration, the split pieces 81, 82 can be removed, such that at least a part of the portion of the joint body 52 that overlaps with the intermediate flange 53 as viewed from the second radial direction can be opened in the second radial direction as the maintenance space S. This allows the maintenance space S to have a larger range in the second circumferential direction as compared to the conventional method of attaching and detaching the motor through the tool insertion hole in the cover of the speed reducer. Thus, it is easier (or unnecessary) to phase the setscrews 111 with the maintenance space S in the second circumferential direction, allowing easy access of the tool to the setscrews 111. This reduces the work space as compared to the conventional method of introducing the tool from the outside of the cover of the speed reducer. As a result, the work efficiency can be improved and the work space can be reduced in attaching and detaching the motor.

In the joint 33 of this embodiment, the seal ring (seal member) 66 is provided between the inner peripheral surface of the motor flange 51 and the outer peripheral surface of the joint body 52 to seal between the motor flange 51 and the joint body 52. With this configuration, the intermediate flange 53 is provided between the motor flange 51 and the motor 12, and thus the motor 12 can be attached and detached without removing the motor flange 51. Therefore, the internal space of the speed reducer 10 can remain sealed by the seal ring 66 provided on the motor flange 51 even when the motor 12 is being attached or detached. Thus, for example, when a lubricant is contained in the internal space of the speed reducer 10, the lubricant can be inhibited from leaking through the gap between the motor flange 51 and the joint body 52.

In the joint 33 of this embodiment, the split pieces 81, 82 adjacent to each other in the second circumferential direction have the mounting pieces (connection portions) 81*b* and the receiving pieces (connection portions) 82*b* that are connected together in the second circumferential direction. With this configuration, the connection between the split pieces 81, 82 adjacent to each other in the second circumferential direction facilitates positioning of the adjacent split pieces 81, 82 relative to each other and positioning of the motor flange 51 and the intermediate flange 53 relative to each other in attaching and detaching the motor 12.

In the joint 33 of this embodiment, the angular dimension of the split pieces 81, 82 in the second circumferential direction is equal to or larger than the minimum interval of the setscrews 111 in the second circumferential direction. With this configuration, the setscrews 111 are easily exposed in the opened maintenance space S even when either one of the split pieces 81, 82 is removed. Thus, it is easier (or unnecessary) to phase the setscrews 111 with the maintenance space S in the second circumferential direction, allowing further improvement of the work efficiency.

In the joint 33 in this embodiment, the positioning tube 53*c* is formed on the outer peripheral edge of the intermediate flange 53, and the receiving recess 51*a* is formed in the outer peripheral edge of the motor flange 51. With this configuration, the positioning tube 53*c* is received in the receiving recess 51*a* to position the intermediate flange 53 in the second radial direction relative to the motor flange 51. This improves the ease of assembling the intermediate flange 53.

Since the speed reducer 10 of this embodiment includes the joint 33 described above, the speed reducer 10 can be maintained easily.

<Modifications>

Figure 6:
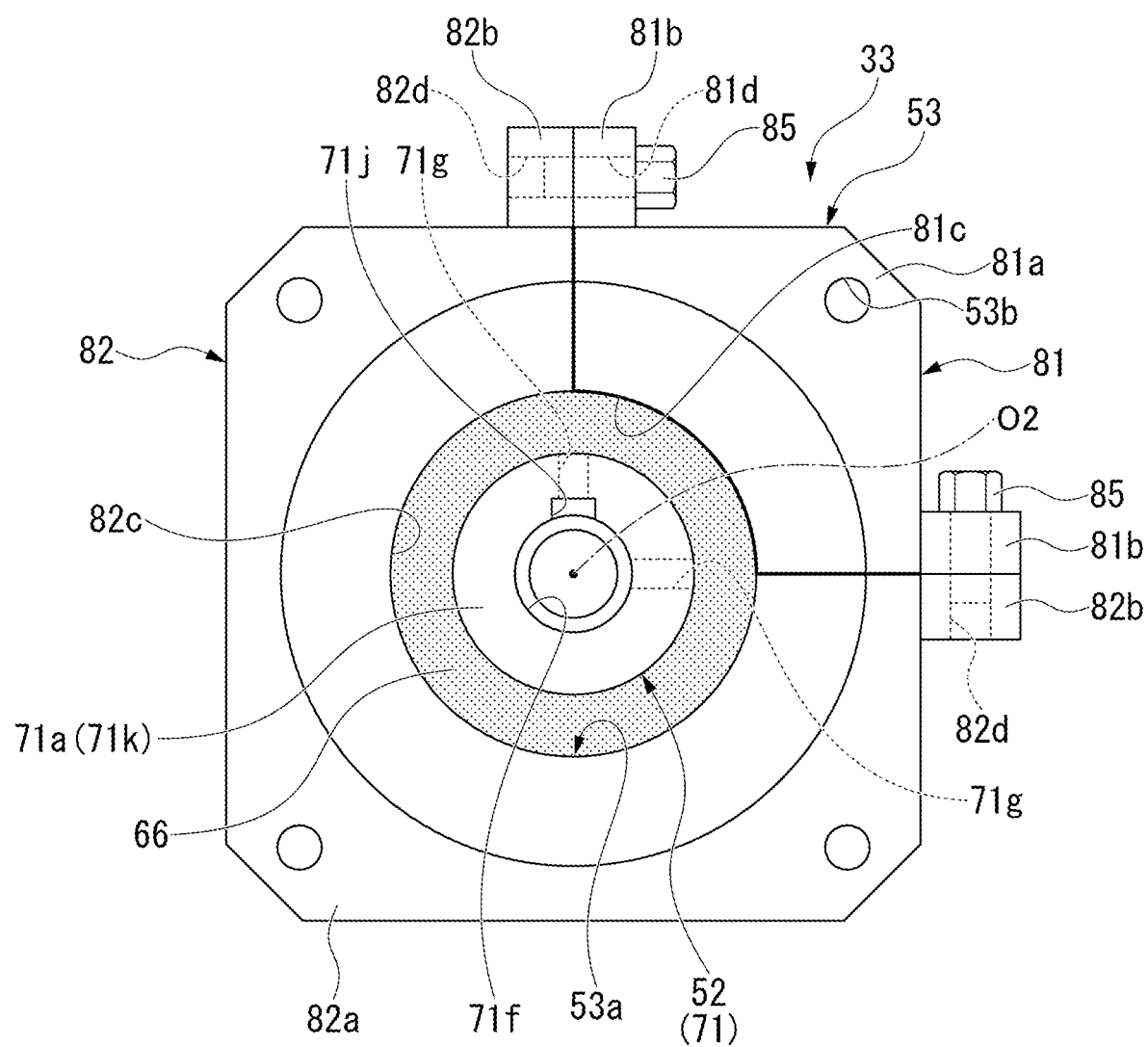
FIG. 6 is a front view of the joint according to a modification viewed from the second side in the axial direction.
Figure 7:
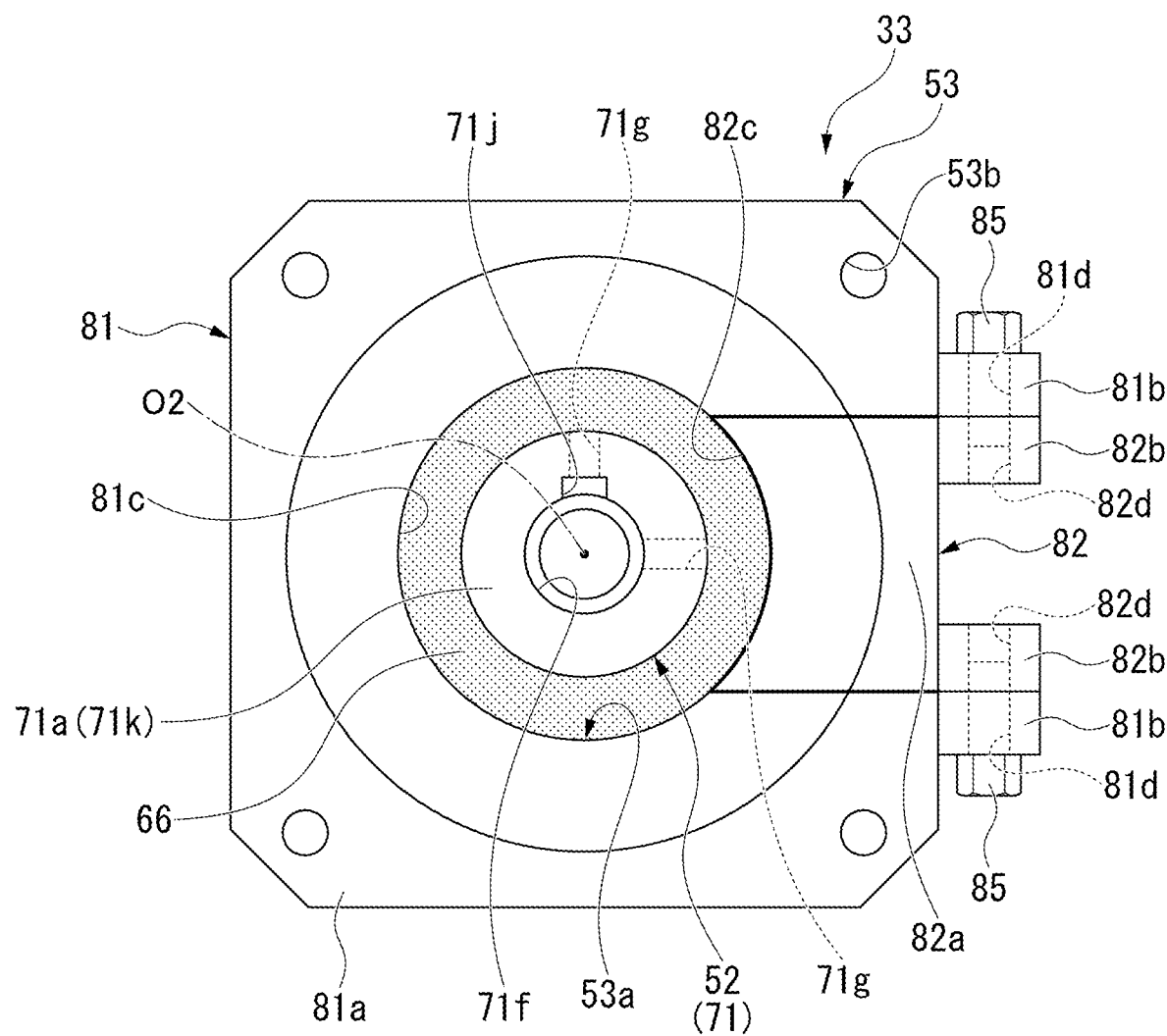
FIG. 7 is a front view of the joint according to a modification viewed from the second side in the axial direction.

The preferred embodiments described above do not limit the disclosure. The embodiments can be modified by adding, omitting and replacing some or all of the features without departing from the scope of the disclosure. The disclosure is not limited by the above description but limited only by the appended claims. In the embodiments above, an arm of an industrial robot has been described as an example of the target member on which the motor unit 1 is installed, but this configuration is not limitative. The target member may be an arm of an industrial apparatus (e.g., a construction machine). In the embodiments described above, the angular dimension of the two split pieces 81, 82 in the second circumferential direction is 180°, but this configuration is not limitative. The angular dimension of the split pieces in the second circumferential direction can be changed as needed. As shown in FIG. 6, the intermediate flange 53 may be configured such that, for example, the first split piece 81 has an angular dimension of 90° and the second split piece 82 has an angular dimension of 270°. In the embodiments described above, each of the split pieces 81, 82 is formed in a fan shape centered on the second axis O2 (such a shape that the two end surfaces of each of the split pieces 81, 82 in the second circumferential direction gradually diverge outward in the second radial direction), but this configuration is not limitative. For example, as shown in FIG. 7, the two end surfaces of each of the split pieces 81, 82 in the second circumferential direction may extend in parallel to each other.

In the embodiment described above, the intermediate flange 53 is formed as an annulus by the two split pieces 81, 82, but this configuration is not limitative. The intermediate flange 53 may be formed of three or more split pieces assembled together in the second circumferential direction, as long as the intermediate flange 53 as a whole is annular in shape. In this case, the angular dimensions of the split pieces may be either equal or different. In the embodiment described above, the fixing members are the setscrews 111, but this configuration is not limitative. The fixing members may be pins or the like.

In the embodiment described above, the seal ring 66 is provided between the motor flange 51 and the joint body 52, but this configuration is not limitative. It is also possible that the speed reducer 10 does not include the seal ring 66 or the seal ring is provided between the intermediate flange 53 and the joint body 52. In the embodiment described above, by way of one example of the connection portions, the mounting pieces 81b and the receiving pieces 82b are coupled together via the screws 85, but this configuration is not limitative. The mounting pieces 81b and the receiving pieces 82b are not essential components. In other words, the split pieces 81, 82 need not be coupled to each other. Coupling of the connection portions may be accomplished by clamps, dowels, magnets, hinges or the like instead of the screws 85.

In the embodiments described above, the positioning tube 53c is formed on the intermediate flange (one of the flanges) 53, and the receiving recess 51a is formed in the motor flange (the other of the flanges) 51, but this configuration is not limitative. It is also possible that the receiving recess is formed in the intermediate flange (the other of the flanges) 53 and the positioning tube is formed on the motor flange (one of the flanges) 51. In the embodiment described above, the motor flange 51 and the intermediate flange 53 are formed as separate members, but this configuration is not limitative. It is also possible that the motor flange 51 and the intermediate flange 53 are integrated together.

In the embodiments disclosed herein, a member formed of multiple components may be integrated into a single component, or conversely, a member formed of a single component may be divided into multiple components. Irrespective of whether or not the components are integrated, they are acceptable as long as they are configured to attain the object of the invention.

The features described throughout this disclosure may be adequately replaced by known features or elements without departing from the spirit of the present disclosure, and the above-described modifications may be appropriately combined.

LIST OF REFERENCE NUMBERS 10 speed reducer
12 motor
32 speed reduction mechanism
33 joint
51 motor flange
51a receiving recess
52 joint body
53 intermediate flange
53c positioning tube
72 input gear
72a connection portion
81 split piece
82 split piece
101 output shaft
111 setscrew (fixing member)
O2 axis (rotation axis)

What is claimed is:

1. A joint comprising:
   a joint body having an input gear meshing with a speed reduction mechanism, the joint body receiving an output shaft of a motor detachably coupled to the joint body; and
   a motor flange disposed between the speed reduction mechanism and the motor;
   an intermediate flange connecting between the motor flange and the motor,
   wherein at least one fixing member for fixing the joint body and the output shaft to each other is provided at at least one position in the joint body that overlaps with the intermediate flange as viewed from a radial direction intersecting a rotation axis of the joint body, and
   wherein the intermediate flange includes a plurality of split pieces capable of splitting in a circumferential direction around the rotation axis, the intermediate flange is formed as an annulus surrounding the joint body by the plurality of split pieces assembled together.

2. The joint of claim 1, wherein a seal member is provided between an inner peripheral surface of the motor flange and an outer peripheral surface of the joint body to seal between the motor flange and the joint body.

3. The joint of claim 2, wherein the plurality of split pieces have a connection portion that connects in the circumferential direction the split pieces adjacent to each other in the circumferential direction.

4. The joint of claim 2,
   wherein the at least one fixing member comprises two fixing members arranged at an interval in the circumferential direction, and
   wherein at least one of the plurality of split pieces has an angular dimension in the circumferential direction that is equal to or larger than a minimum interval between the two fixing members in the circumferential direction.

5. The joint of claim 2,
wherein one of the intermediate flange and the motor flange is defined as a first flange, and the other is defined as a second flange,
wherein a tube is formed on an outer peripheral edge of the first flange, and the tube projects in an axial direction along the rotation axis and extends over an entire periphery of the first flange, and
wherein a receiving recess is formed in an outer peripheral edge of the second flange, and the receiving recess receives the tube.

6. The joint of claim 1, wherein the plurality of split pieces have a connection portion that connects in the circumferential direction the split pieces adjacent to each other in the circumferential direction.

7. The joint of claim 6,
wherein the at least one fixing member comprises two fixing members arranged at an interval in the circumferential direction, and
wherein at least one of the plurality of split pieces has an angular dimension in the circumferential direction that is equal to or larger than a minimum interval between the two fixing members in the circumferential direction.

8. The joint of claim 6,
wherein one of the intermediate flange and the motor flange is defined as a first flange, and the other is defined as a second flange,
wherein a tube is formed on an outer peripheral edge of the first flange, and the tube projects in an axial direction along the rotation axis and extends over an entire periphery of the first flange, and
wherein a receiving recess is formed in an outer peripheral edge of the second flange, and the receiving recess receives the tube.

9. The joint of claim 1,
wherein the at least one fixing member comprises two fixing members arranged at an interval in the circumferential direction, and
wherein at least one of the plurality of split pieces has an angular dimension in the circumferential direction that is equal to or larger than a minimum interval between the two fixing members in the circumferential direction.

10. The joint of claim 9,
wherein one of the intermediate flange and the motor flange is defined as a first flange, and the other is defined as a second flange,
wherein a tube is formed on an outer peripheral edge of the first flange, and the tube projects in an axial direction along the rotation axis and extends over an entire periphery of the first flange, and
wherein a receiving recess is formed in an outer peripheral edge of the second flange, and the receiving recess receives the tube.

11. The joint of claim 1,
wherein one of the intermediate flange and the motor flange is defined as a first flange, and the other is defined as a second flange,
wherein a tube is formed on an outer peripheral edge of the first flange, and the tube projects in an axial direction along the rotation axis and extends over an entire periphery of the first flange, and
wherein a receiving recess is formed in an outer peripheral edge of the second flange, and the receiving recess receives the tube.

12. A joint comprising:
a joint body having an input gear meshing with a speed reduction mechanism, the joint body receiving an output shaft of a motor detachably coupled to the joint body;
a motor flange disposed between the speed reduction mechanism and the motor;
an intermediate flange connecting between the motor flange and the motor, and
a seal member provided between an inner peripheral surface of the motor flange and an outer peripheral surface of the joint body to seal between the motor flange and the joint body,
wherein two fixing members for fixing the joint body and the output shaft to each other are provided at positions in the joint body that overlap with the intermediate flange as viewed from a radial direction intersecting a rotation axis of the joint body, and the two fixing members are arranged at an interval in a circumferential direction around the rotation axis,
wherein the intermediate flange includes a plurality of split pieces capable of splitting in the circumferential direction, and the intermediate flange is formed as an annulus surrounding the joint body by the plurality of split pieces assembled together,
wherein at least one of the plurality of split pieces has an angular dimension in the circumferential direction that is equal to or larger than a minimum interval between the two fixing members in the circumferential direction,
wherein the plurality of split pieces have a connection portion that connects in the circumferential direction the split pieces adjacent to each other in the circumferential direction,
wherein one of the intermediate flange and the motor flange is defined as a first flange, and the other is defined as a second flange,
wherein a tube is formed on an outer peripheral edge of the first flange, and the tube projects in an axial direction along the rotation axis and extends over an entire periphery of the first flange, and
wherein a receiving recess is formed in an outer peripheral edge of the second flange, and the receiving recess receives the tube.

13. A speed reducer comprising:
a joint; and
a speed reduction mechanism meshed with an input gear of the joint,
wherein the joint includes:
a joint body having the input gear, the joint body receiving an output shaft of a motor detachably coupled to the joint body;
a motor flange disposed between the speed reduction mechanism and the motor; and
an intermediate flange connecting between the motor flange and the motor,
wherein at least one fixing member for fixing the joint body and the output shaft to each other is provided at at least one position in the joint body that overlaps with the intermediate flange as viewed from a radial direction intersecting a rotation axis of the joint body, and wherein the intermediate flange includes a plurality of split pieces capable of splitting in a circumferential direction around the rotation axis, and the intermediate flange is formed as an annulus surrounding the joint body by the plurality of split pieces assembled together.

* * * * *